United States Patent [19]
Wagner

[11] Patent Number: 5,949,148
[45] Date of Patent: Sep. 7, 1999

[54] D.C. POWER DISTRIBUTION AND FUSE PANEL UNIT

[76] Inventor: William F. Wagner, 11010 Cedar View, Houston, Tex. 77041

[21] Appl. No.: 08/897,259

[22] Filed: Jul. 18, 1997

[51] Int. Cl.⁶ ........................................................ H01H 3/34
[52] U.S. Cl. ........................................ 307/10.1; 307/141.4
[58] Field of Search ..................................... 307/9.1–10.8, 307/141–141.8, 11, 29, 38, 39, 85–87, 43, 52, 80; 361/195–201

[56] References Cited

U.S. PATENT DOCUMENTS

| | | | |
|---|---|---|---|
| 3,993,914 | 11/1976 | Conrad et al. | 307/141 |
| 4,276,483 | 6/1981 | Hayden | 307/141 |
| 5,142,162 | 8/1992 | Sundeen et al. | 307/10.1 |

*Primary Examiner*—Richard T. Elms
*Attorney, Agent, or Firm*—Kenneth A. Roddy

[57] ABSTRACT

A D.C. power distribution and fuse panel unit facilitates installation and trouble shooting of vehicle auxiliary electrical equipment such as two-way radios, sirens, computer mobile data terminals, and mobile phones in police and other emergency vehicles. The unit is installed beneath the dash of a vehicle or other location inside the vehicle and is connected to the battery by a single wire which passes through the firewall, and is joined to the ignition circuit by a second wire connected to a suitable point such as the existing vehicle fuse block. The unit is supplied with a constant source of positive D.C. voltage, and also with ignition voltage when the vehicle ignition switch is turned on. The unit contains solid state circuitry including relay circuits, timer circuit, and has a plurality of fused power output terminals including constant power, ignition controlled power, and delayed power shut-off terminals for connecting various auxiliary electrical devices having different power disconnect requirements, and may also have a plurality of individual fused input/output circuits. The unit provides a common power distribution module for connecting and supplying power to various types of auxiliary electrical equipment according to their particular requirements. The unit may also have a test switch to speed up the delayed shut-off sequence and allow rapid testing and trouble shooting.

12 Claims, 4 Drawing Sheets

D.C. POWER DISTRIBUTION AND FUSE PANEL UNIT

BACKGROUND OF THE INVENTION

1. Field of the Invention

This invention relates generally to vehicle auxiliary electrical equipment and fuse panels and more particularly to a D.C. power distribution and fuse panel unit for connecting a plurality of vehicle auxiliary electrical devices which is controlled by the vehicle ignition and has constant power, ignition controlled, and delayed power shut-off circuits for the various devices.

2. Brief Description of the Prior Art

The installation and trouble shooting of vehicle auxiliary electrical equipment such as two-way radios, sirens, computers, and mobile phones in police and other emergency vehicles has heretofore been a time consuming and expensive process. Several variations of installation methods have existed through the years, each tailored to the requirements of the auxiliary equipment and the needs of the particular organization using the vehicles.

Some organizations wire the auxiliary electrical equipment through ignition operated relays so that the equipment is automatically turned off when the vehicle ignition is turned off.

Other organizations use relays with timers to achieve a delayed shut-off required by a computer mobile data terminal (MDT) to prevent a slow down or total shut down of its host computer when it cannot deliver messages back to the MDT because it has been turned off.

Still other organizations simply wire the auxiliary electrical equipment hot (connected direct to the battery) and depend on the operator to physically turn off each piece of equipment separately.

All of the installation methods described above have certain drawbacks and limitations. The ignition controlled relay installation requires the vehicle ignition switch to be turned on (keys in the vehicle) to operate the equipment. Wiring the auxiliary electrical equipment hot causes dead batteries when the operator forgets to turn the equipment off. The delayed shut-off relay and timer combination keeps all equipment active during the shut-off delay.

Regardless of the installation method used, each piece of auxiliary electrical equipment still requires one or more power leads that usually have an in-line fuse holder spliced into the wire. When relays are used, they must be mounted and wired into the system. This is usually accomplished under the hood of the vehicle, and each wire must be passed through the firewall of the vehicle to reach the auxiliary equipment. In the case of a police vehicle emergency light bar, it may have as many as eight leads and each circuit in the light bar requires an in-line fuse to protect the light controller.

Thus, installation of vehicle auxiliary electrical equipment such as two-way radios, sirens, computers, and mobile phones in police and other emergency vehicles is a labor intensive time consuming process and the resultant large bundle of wires makes trouble shooting a simple blown fuse a major ordeal. The task of replacing a blown fuse usually requires unbundling the numerous wires so that a wire could be traced to the proper in-line fuse holder and then rebundling the numerous wires after the blown fuse is replaced.

There are several patents which disclose systems for controlling auxiliary power devices in a vehicle.

Anki et al, U.S. Pat. No. 4,403,155 discloses an improved wiring system in which a connection box having a plurality of terminals, electrical circuitry, and bus bars. Each bus bar provides a forked conductive path between the circuitry and terminals and allows outside connectors to be connected by wires in a one-to-one correspondence.

Mane et al, U.S. Pat. No. 4,689,718 discloses a programmable automobile junction box housing printed circuit boards having receptacles for receiving tabs depending from an elongated member which connect the circuit pathways corresponding to vehicle options.

Sawai et al, U.S. Pat. No. 4,850,884 discloses a controller with wiring for a vehicle. The controller has a junction block with at least one bus bar circuit board on which harness branch circuits to which electrical devices are connected.

Copeland et al, U.S. Pat. No. 4,864,154 discloses a solid state digital and analog circuit which is connected between the vehicle battery and a two-way radio, public address system, etc. in an emergency vehicle to prevent the auxiliary electrical device from draining the battery. When the ignition is turned off, a timer and relay in the circuit disconnects the auxiliary device after a prescribed amount of time.

Tamer, U.S. Pat. No. 4,956,561 discloses a smart power connector for use in a vehicular smart power multiplexing network Smart power connectors connect the power network with various peripheral devices.

The present invention is distinguished over the prior art in general, and these patents in particular by a D.C. power distribution and fuse panel unit which facilitates installation and trouble shooting of vehicle auxiliary electrical equipment such as two-way radios, sirens, computer mobile data terminals, and mobile phones in police and other emergency vehicles. The unit is installed beneath the dash of a vehicle or other location inside the vehicle and is connected to the battery by a single wire which passes through the firewall, and is joined to the ignition circuit by a second wire connected to a suitable point such as the existing vehicle fuse block. The unit is supplied with a constant source of positive D.C. voltage, and also with ignition voltage when the vehicle ignition switch is turned on. The unit contains solid state circuitry including relay circuits, timer circuit, and has a plurality of fused power output terminals including constant power, ignition controlled power, and delayed power shut-off terminals for connecting various auxiliary electrical devices having different power disconnect requirements, and may also have a plurality of individual fused input/output circuits. The unit provides a common power distribution module for connecting and supplying power to various types of auxiliary electrical equipment according to their particular requirements. The unit may also have a test switch to speed up the delayed shut-off sequence and allow rapid testing and trouble shooting.

SUMMARY OF THE INVENTION

It is therefore an object of the present invention to provide a D.C. power distribution and fuse panel unit which is easily and quickly installed in vehicles to connect auxiliary electrical equipment such as two-way radios, sirens, computers, and mobile phones and requires only a single power lead to pass through the vehicle firewall for connection to the battery.

It is another object of this invention to provide a D.C. power distribution and fuse panel unit for installation in vehicles to connect auxiliary electrical equipment such as two-way radios, sirens, computers, and mobile phones which is controlled by the vehicle ignition switch.

Another object of this invention is to provide a D.C. power distribution and fuse panel unit for installation in vehicles to connect auxiliary electrical equipment such as two-way radios, sirens, computers, and mobile phones which is controlled by the vehicle ignition switch and has a delayed shut-off.

Another object of this invention is to provide a D.C. power distribution and fuse panel unit for installation in vehicles to connect auxiliary electrical equipment such as two-way radios, sirens, computers, and mobile phones which combines all the electrical power connections in a single unit regardless of whether the electrical device requires constant power, ignition controlled on/off or delayed shut-off.

Another object of this invention is to provide a D.C. power distribution and fuse panel unit for installation in vehicles to connect auxiliary electrical equipment such as two-way radios, sirens, computers, and mobile phones which simplifies trouble shooting of the electrical circuits and replacement of blown fuses.

Another object of this invention is to provide a D.C. power distribution and fuse panel unit for installation in vehicles to connect auxiliary electrical equipment such as two-way radios, sirens, computers, and mobile phones which contains all the fuses for the externally controlled electrical circuits in a single unit and utilizes plug-in type fuses and quick disconnect type plugs for all connections.

A further object of this invention is to provide a D.C. power distribution and fuse panel unit having a plurality of individual in/out fused circuits for externally powered devices.

A still further object of this invention is to provide a D.C. power distribution and fuse panel unit for installation in vehicles to connect auxiliary electrical equipment such as two-way radios, sirens, computers, and mobile phones which simple in construction, economical to manufacture, and rugged and reliable in operation.

Other objects of the invention will become apparent from time to time throughout the specification and claims as hereinafter related.

The above noted objects and other objects of the invention are accomplished by a D.C. power distribution and fuse panel unit which facilitates installation and trouble shooting of vehicle auxiliary electrical equipment such as two-way radios, sirens, computer mobile data terminals, and mobile phones in police and other emergency vehicles. The unit is installed beneath the dash of a vehicle or other location inside the vehicle and is connected to the battery by a single wire which passes through the firewall, and is joined to the ignition circuit by a second wire connected to a suitable point such as the existing vehicle fuse block. The unit is supplied with a constant source of positive D.C. voltage, and also with ignition voltage when the vehicle ignition switch is turned on. The unit contains solid state circuitry including relay circuits, timer circuit, and has a plurality of fused power output terminals including constant power, ignition controlled power, and delayed power shut-off terminals for connecting various auxiliary electrical devices having different power disconnect requirements, and may also have a plurality of individual fused input/output circuits. The unit provides a common power distribution module for connecting and supplying power to various types of auxiliary electrical equipment according to their particular requirements. The unit may also have a test switch to speed up the delayed shut-off sequence and allow rapid testing and trouble shooting.

DESCRIPTION OF THE PREFERRED EMBODIMENT

The utilitarian features of the present invention are best understood when compared with conventional prior art methods of installation and connection of vehicle auxiliary electrical equipment. Therefore, a brief discussion of the prior art methods follows. In the following examples, the auxiliary equipment include a two-way radio, a siren, a computer mobile data terminal (MDT), a radar unit, and a light bar.

Figure 1:
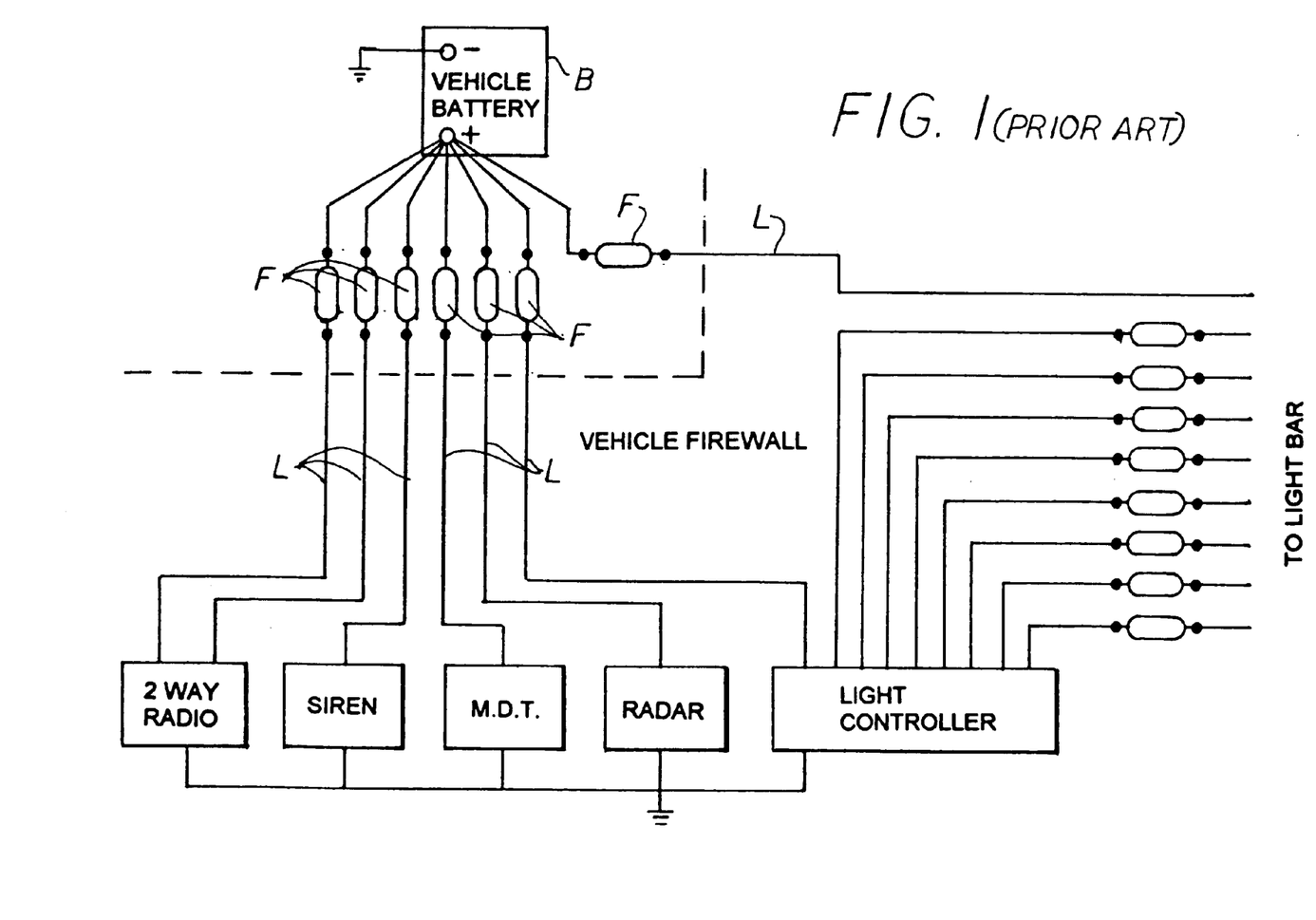
FIG. 1 is an electrical schematic diagram showing a prior art wiring circuit for the connection of auxiliary electrical equipment wherein the auxiliary electrical devices are connected direct to the battery.

FIG. 1 illustrates a typical prior art wiring circuit for the connection of auxiliary electrical equipment wherein the auxiliary electrical devices are connected "hot" or direct to the battery. In this installation it can be seen that each piece of auxiliary electrical equipment requires one or more power leads L that usually have an in-line fuse holder F spliced into the wire, and each wire must be passed through the firewall of the vehicle to reach the auxiliary equipment. This type of installation requires the operator to physically turn off each piece of equipment separately, and often results in a dead battery when the operator forgets to turn the equipment off.

Figure 2:
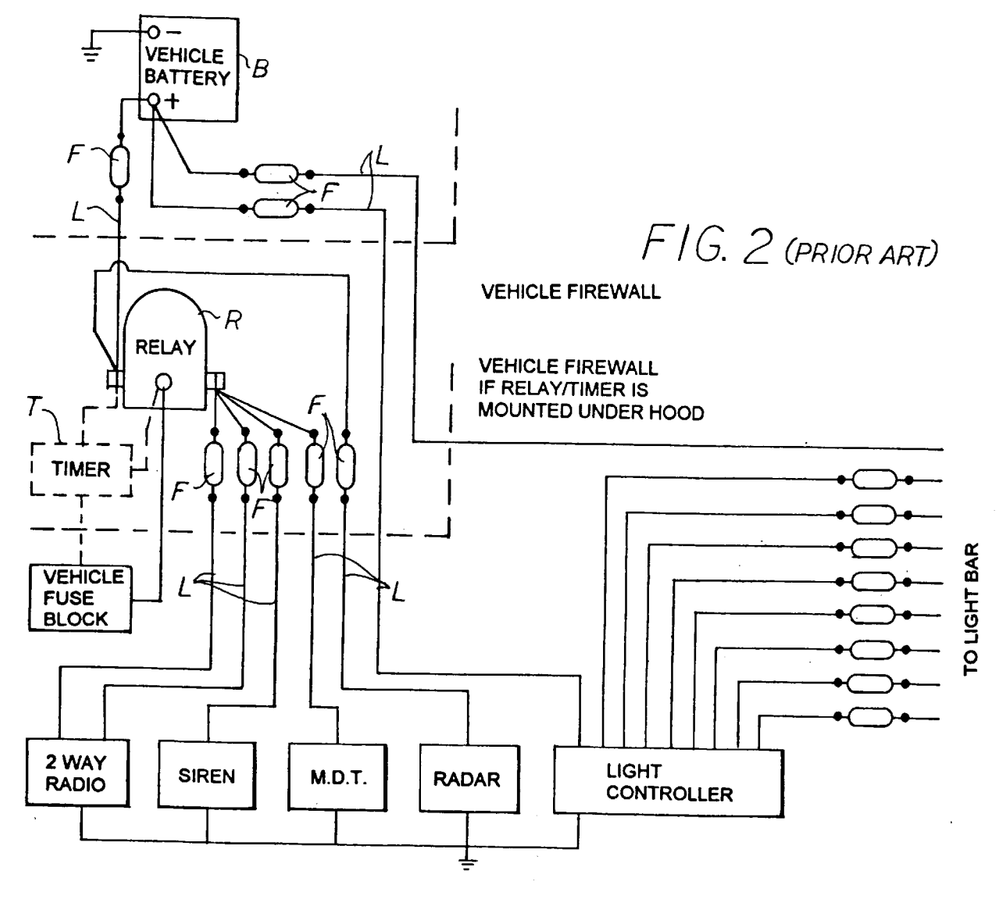
FIG. 2 is an electrical schematic diagram showing a prior art wiring circuit for the connection of auxiliary electrical equipment wherein the auxiliary electrical devices are connected to the battery through a relay, or through a relay and timer combination.

FIG. 2 illustrates typical prior art wiring circuits for the connection of auxiliary electrical equipment wherein the auxiliary electrical devices are connected to the battery through a relay R, or through a delayed shut-off relay R and timer T combination. In these types of installations, each piece of auxiliary electrical equipment and the relay R or relay and timer T combination require one or more power leads L that usually have an in-line fuse holder F spliced into the wire, and each wire must be passed through the firewall of the vehicle to reach the auxiliary equipment. Fewer wires are required to be passed through the firewall if the relay R and timer T are mounted under the dash rather than under the hood. These types of installations also require the vehicle ignition switch to be turned on (keys in the vehicle) to operate the equipment, and the delayed shut-off relay and timer combination keeps all equipment active during the shut-off delay.

Figure 3:
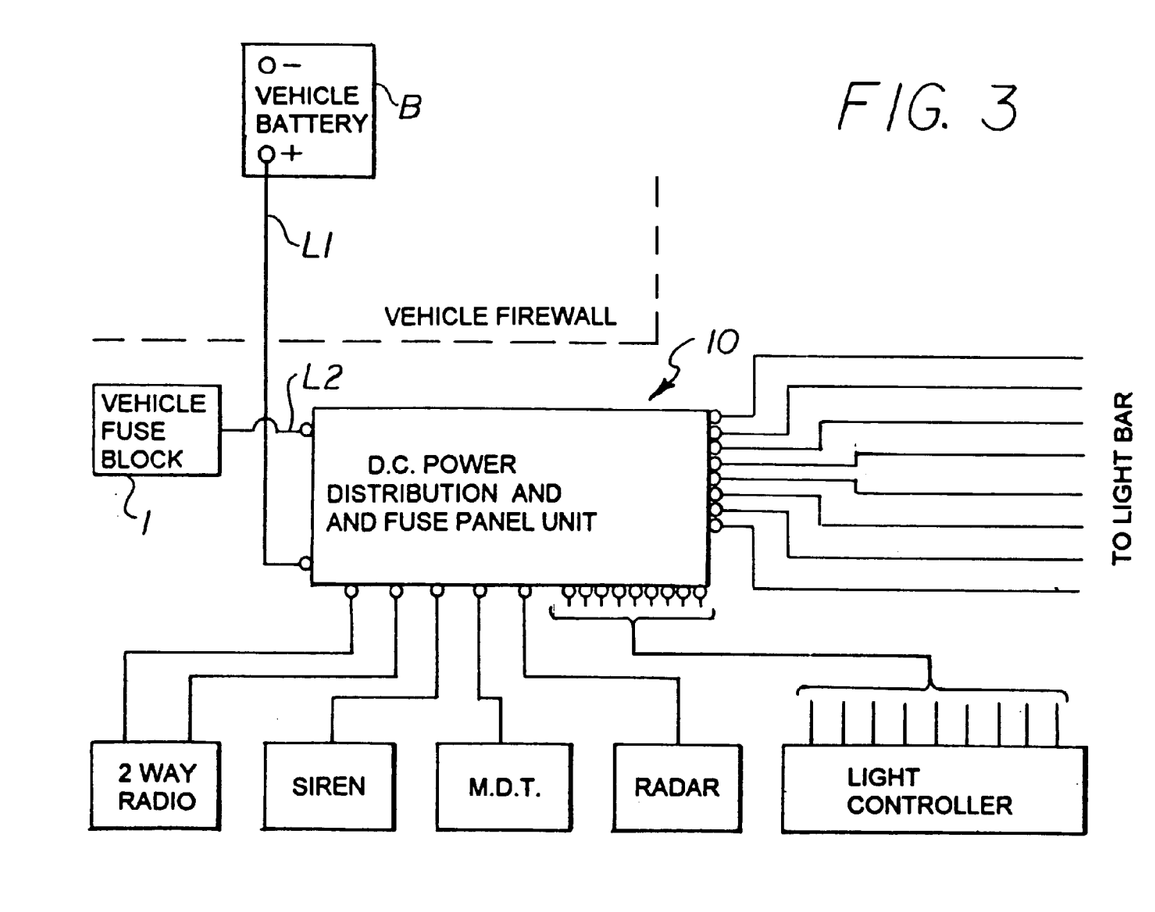
FIG. 3 is an electrical schematic diagram of the D.C. power distribution and fuse panel unit in accordance with the present invention wherein the unit is connected to the battery by a single lead and the ignition system at the fuse block by a second lead and distributes power to the auxiliary electrical devices through a plurality of fused terminals.

Referring now to FIG. 3, the wiring circuit of the present D.C. power distribution and fuse panel unit 10 is shown. The D.C. power distribution and fuse panel unit 10 (described in detail hereinafter) is installed beneath the dash of the vehicle and is connected to the battery by a single wire lead L1 which is passed through the firewall, and joined to the ignition circuit by a second wire lead L2 connected to a suitable point such as the existing vehicle fuse block. The first wire lead L1 connected with the battery supplies the unit 10 with a constant source of positive D.C. voltage, and the second wire lead L2 supplies the unit with ignition voltage only when the vehicle ignition switch is turned on. A printed circuit board in the unit 10 contains solid state circuitry including relay circuits, a timer circuit, a plurality of individual fused input/output circuits, and a testing circuit (described below). The various auxiliary electrical devices are connected to the unit 10 through a plurality of fuse holders and power output connectors mounted on the circuit board. The fused power outputs include; fused outputs providing constant power, fused outputs providing ignition controlled power, and fused outputs providing delayed power shut-off, and a plurality of individual input/output fused circuits for externally powered devices, such as a light controller for a light bar.

Thus, it can be seen that the present D.C. power distribution and fuse panel unit 10 is installed quickly and easily and requires only a single wire to be passed through the firewall and provides a common power distribution module for connecting and supplying power to various types of auxiliary electrical equipment according to their particular requirements. The present D.C. power distribution and fuse panel unit 10 also provides a test switch (described below) which speeds up the delayed shut-off sequence and allows rapid testing and trouble shooting.

Figure 4:
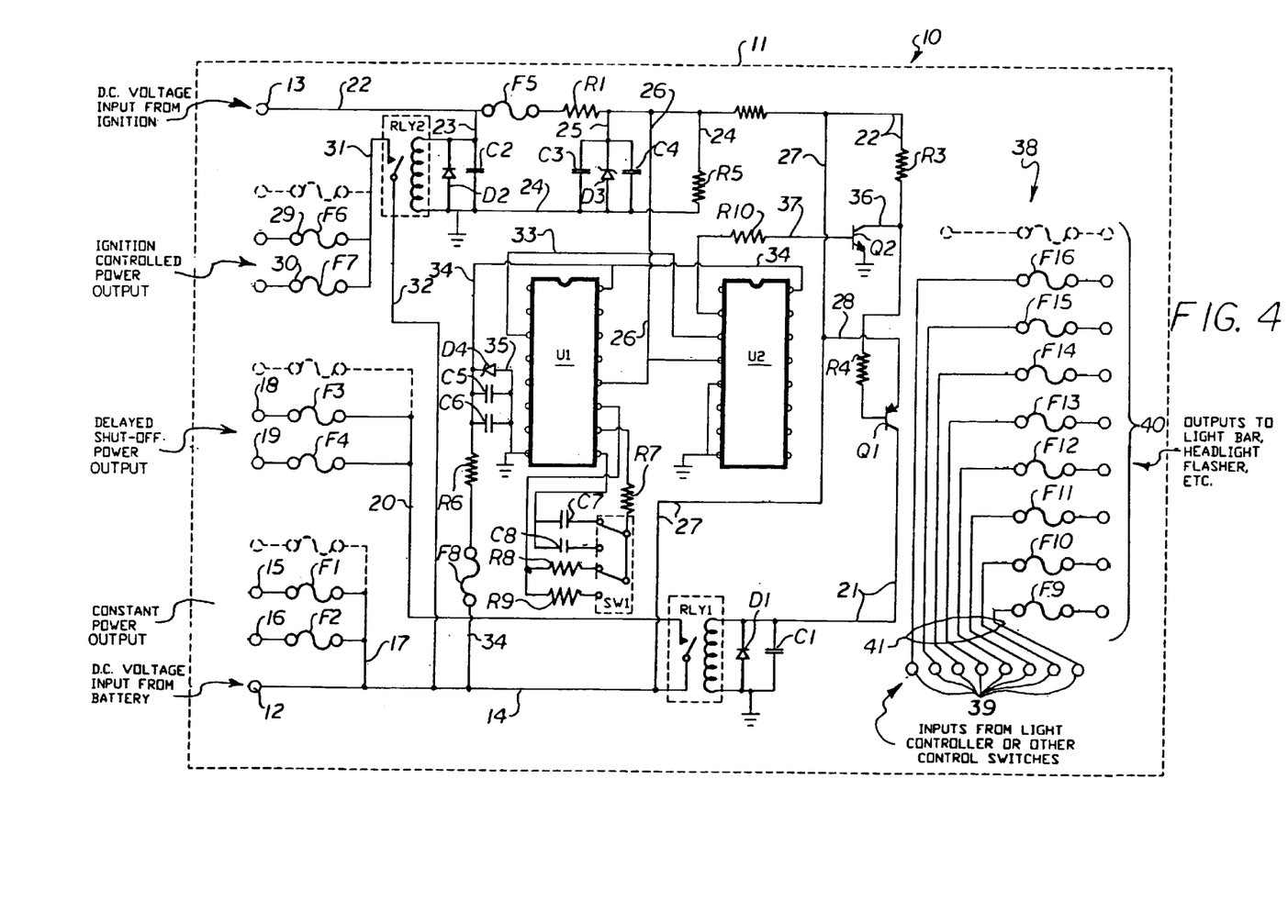
FIG. 4 is an electrical schematic diagram of the electrical circuitry of the D.C. power distribution and fuse panel unit in accordance with the present invention.

Referring now to FIG. 4 of the drawings by numerals of reference, the circuitry of the D.C. power distribution and fuse panel unit 10 is shown. The circuitry of the unit 10 is contained on a printed circuit board 11 and all the components and fuse holders are mounted on the circuit board.

The circuit has a battery D.C. input terminal 12 which is connected to the positive terminal of the existing vehicle battery to provide a constant source of positive D.C. voltage, and an ignition voltage input terminal 13 which is connected to a suitable point that is energized by the ignition circuit such as the existing vehicle fuse block to provide a source of positive D.C. voltage only when the vehicle ignition switch is turned on.

The battery D.C. input terminal 12 is connected by lead 14 to one side of the normally open contacts of a delayed shut-off power relay RLY1. Constant voltage output terminals 15 and 16 are connected with the battery D.C. input terminal 12 through lead 17 and fuses F1 and F2. The constant voltage output terminals 15 and 16 become hot (supplied with voltage) as soon as the battery connection is made and remain hot at all times. Delayed shut-off power voltage output terminals 18 and 19 are connected to the other side of the normally open contacts of relay RLY1 through lead 20 and fuses F3 and F4. The delayed shut-off power voltage terminals 18 and 19 become joined to the battery D.C. voltage input terminal 12 through leads 20 and 14 to provide power upon closure of the contacts.

One side of the coil of relay RLY1 is grounded and the other side of the coil is connected by lead 21 to the collector of a transistor Q1. A diode D1 and capacitor C1 connected in parallel with the coil of relay RLY1 provide a voltage surge protection circuit for transistor Q1 when the magnetic field collapses across the coil of relay RLY1.

The ignition voltage input terminal 13 is connected by lead 23 to one side of the coil of an ignition controlled relay RLY2 through a voltage surge protection circuit consisting of diode D2 and capacitor C2 which are connected in parallel across the coil of relay RLY2. The other side of the coil of relay RLY2 is grounded. The lead 23 is joined to lead 22 between the input terminal 13 and the fuse F5. The ignition voltage input terminal 13 is also connected by lead 22 to the voltage divider resistors R2 and R5 through series connected circuit protection fuse F5 and current limiting resistor R1, and through lead 26 to the reset terminals of a counter U1 and flip-flop U2 (described below). The divider resistors R2 and R5 prevent small pulses of foreign voltage on the vehicle ignition input from triggering the high impedance reset terminals of U1 and U2. The leads 24, 25, and 26 are joined to lead 22 between the resistors R1 and R2.

Ignition controlled power output terminals 29 and 30 are connected to one side of the normally open contacts of the relay RLY2 through lead 31 and fuses F6 and F7. The other side of the contacts of relay RLY2 are connected to the D.C. voltage input terminal 12 by lead 32 connected to the lead 14. The ignition controlled power output terminals 29 and 30 become joined to the battery D.C. voltage input terminal 12 through leads 14 and 32 upon closure of the contacts when the ignition is turned on to provide ignition controlled power.

Although two power output terminals of each type have been shown, it should be understood that any number of power output terminals and fused input/output circuits (described below) may be provided as indicated by dashed lines.

The timing circuitry includes a 14-stage binary ripple counter U1 (such as a CD4060 integrated circuit CMOS chip), a JK flip-flop U2 (such as a CD4027 integrated circuit CMOS chip), and a double-pole double-throw test switch SW1. The output of counter U1 and the clock input of JK flip-flop U2 are joined by lead 32. Operating voltage from the battery D.C. voltage input terminal 12 is provided to the voltage inputs of counter U1 and flip flop U2 through lead 14 and lead 34 through circuit protection fuse F8 and current limiting resistor R6 and through lead 35 to voltage regulator zener diode D4 and filter network capacitors C5 and C6.

The armature of the double-pole double-throw test switch SW1 is connected to the counter U1 through resistor R7. In a first or normal operating position, the armature of the switch completes a circuit between two terminals of the counter U1 through a capacitor C7 and resistor R8, and in a second position, completes a circuit between the same two terminals of the counter through a capacitor C8 and resistor R9.

The battery D.C. voltage input terminal 12 is connected by lead 14 to the normally open contacts of the delayed shut-off power relay RLY1 and to the emitter of transistor Q1 through leads 27 and 28. The collector of transistor Q1 is connected to one side of the coil of relay RLY1 and the voltage surge protection network diode D1 and capacitor C1 through lead 21. The other side of the coil of relay RLY1 and diode D1 and capacitor C1 are connected to ground.

A lead 36 connected between resistors R3 and R4 that are connected to the base of transistor Q1 is connected to the collector of a second transistor Q2. The emitter of the transistor Q2 is grounded. The base of the transistor Q2 is connected by lead 37 to an output of flip flop U2 through a resistor R10.

The power distribution and fuse panel unit 10 also has an input/output fused circuit portion 38 consisting of a plurality of input terminals 39 connected to respective output terminals 40 by individual leads 41 having fuse holders which receive plug-in type fuses F9–F16. The fused circuit portion 38 may be used to provide fused output circuits for externally powered devices such as a light controller that powers various different functions of an overhead light bar.

OPERATION

The D.C. power distribution and fuse panel unit 10 is installed beneath the dash of the vehicle or other suitable location inside the vehicle and the battery D.C. input terminal 12 is connected to the battery by a single wire which is passed through the firewall. The ignition voltage input terminal 13 is joined to the ignition circuit by a second wire connected to a suitable point such as the existing vehicle fuse block. The unit 10 is thus supplied with a constant source of positive D.C. voltage, and also with ignition voltage only when the vehicle ignition switch is turned on. The various auxiliary electrical devices are connected to the appropriate fused power output terminals of the unit 10 corresponding to their particular voltage on/off requirements, such as constant power, ignition controlled power or delayed power shut-off.

For example, if the vehicle is equipped with a computer mobile data terminal (MDT) it would be connected to one of the delayed shut-off power output terminals 18 or 19, a device such as a two-way radio or radar unit may be connected to a constant voltage output terminal 15 or 16, and a siren may be connected to an ignition controlled voltage output terminal 29 or 30.

The constant voltage output terminals 15 and 16 are supplied with D.C. voltage as soon as the battery connection is made and remain energized at all times.

When the ignition is turned on, a positive voltage is applied to the coil of ignition controlled relay RLY2 and the reset terminals of the counter U1 and JK flip-flop U2 of the timing circuit. This closes the contacts of relay RLY2 to provide ignition controlled voltage through fuses F6 and F7 to the ignition controlled output terminals 29 and 30, and the reset terminals of the counter U1 and flip-flop U2 causing an output terminal of the flip-flop U2 to supply voltage to the delayed shut-off power relay RLY1 through transistors Q1 and Q2 and thereby closing the contacts of the relay RLY1. Closing of the contacts of relay RLY1 supplies voltage to the delayed shut-off power output terminals 18 and 19 through fuses F3 and F4.

When the ignition switch is turned off, the positive voltage is removed from the coil of the ignition controlled relay RLY2 and the reset terminals of the counter U1 and JK flip-flop U2 of the timing circuit. This causes the contacts of relay RLY2 to open and thereby shut-off voltage to the ignition controlled power output terminals 29 and 30 and causes the counter U1 of the timing circuit to start its count routine. After the predetermined amount of time has lapsed (for example, a minimum of 1 hour), voltage is removed from the delayed shut-off power off relay RLY1 through transistors Q1 and Q2 and the contacts of the relay RLY1 open. Opening of the contacts of relay RLY1 shuts off voltage to the delayed shut-off power output terminals 18 and 19 after the predetermined time period.

The double-pole double-throw test switch SW1 is used to speed up the delay time of the timing circuit by changing the resistance and capacitance values in the oscillator circuit of the counter U1 so that an operational test can be completed in about one minute rather than the normal time delay (for example 1 hour). When the test switch SW1 is in the normal operating position a circuit is completed through resistor R7 and the first pair of switch terminals and capacitor C7 and resistor R8, and when moved to the test position, a circuit is completed through resistor R7 and the second pair of switch terminals through capacitor C8 and resistor R9.

The fused circuit portion 38 of the power distribution and fuse panel unit 10 may be used to provide fused output circuits for externally powered devices. For example, the leads of a light controller that powers various different functions of a police vehicle emergency light bar may be connected to the terminals of the individual fused circuits whereby each circuit in the light bar would be provided with a fuse to protect the light controller.

While this invention has been described fully and completely with special emphasis upon a preferred embodiment, it should be understood that within the scope of the appended claims the invention may be practiced otherwise than as specifically described herein.

I claim:

1. A power distribution and fuse panel unit for installation in a vehicle to facilitate connection of various vehicle auxiliary electrical devices having different power disconnect requirements, comprising:

a modular unit having a constant power input terminal adapted to be connected with a battery to provide a source of constant D.C. voltage, and an ignition controlled power input terminal adapted to be connected to an ignition system of the vehicle to provide a source of ignition controlled D.C. voltage upon the ignition system being turned on;

a plurality of constant power output terminals connected with said constant power input terminal for connecting auxiliary electrical devices to be supplied with constant power independently of the operation of the vehicle ignition system;

a plurality of delayed shut-off power output terminals connected with said constant power input terminal and with said ignition controlled power input terminal for connecting auxiliary electrical devices to be supplied with power for a predetermined time interval after the ignition system has been turned off;

fuse elements connected between said constant power input terminal and said plurality of constant power output terminals and between said constant power input terminal and said plurality of delayed shut-off power output terminals; and timing means and relay means connected between said constant power input and ignition controlled power input terminals and said plurality of delayed shut-off power output terminals to provide voltage to said plurality of delayed shut-off power output terminals upon said ignition system being turned on, and after a predetermined time interval after the ignition system has been turned off, to disconnect voltage to said plurality of delayed shut-off power output terminals.

2. The power distribution and fuse panel unit according to claim 1 further comprising;

a plurality of input and output terminals independent from said vehicle battery and said vehicle ignition system;

each of said input and output terminals joined together by a respective lead having a fuse holder for receiving fuses to provide a plurality of individual fused circuits for connecting externally powered devices.

3. The power distribution and fuse panel unit according to claim 1 further comprising;

a test switch and testing circuit operatively connected with said timing means to selectively shorten the time interval between the ignition system being turned off and the disconnection of voltage to said plurality of delayed shut-off power output terminals to quickly determine the operational status of the power distribution and fuse panel unit.

4. The power distribution and fuse panel unit according to claim 1 wherein said timing means includes an interconnected integrated circuit binary counter and an integrated flip-flop circuit;

said ignition controlled power input terminal is connected with said counter and said flip-flop circuit;

said relay means includes a delayed shut-off power relay connected between said constant power input terminal and said flip-flop circuit and having normally open contacts connected with said plurality of delayed shut-off power output terminals;

said ignition controlled power input terminal is connected with said delayed shut-off power relay to close said contacts and thereby supply D.C. voltage to said plurality of delayed shut-off power output terminals upon the ignition being turned on; and said counter being activated upon the ignition system being turned off, and after the predetermined time interval said flip-flop circuit opens said contacts to disconnect voltage to said plurality of delayed shut-off power output terminals.

5. A power distribution and fuse panel unit for installation in a vehicle to facilitate connection of various vehicle auxiliary electrical devices having different power disconnect requirements, comprising:

a modular unit having a constant power input terminal adapted to be connected with a battery to provide a source of constant D.C. voltage, and an ignition controlled power input terminal adapted to be connected to an ignition system of the vehicle to provide a source of ignition controlled D.C. voltage upon the ignition system being turned on;

a plurality of constant power output terminals connected with said constant power input terminal for connecting auxiliary electrical devices to be supplied with constant power independently of the operation of the vehicle ignition system;

a plurality of ignition controlled power output terminals connected with said ignition controlled power input terminal for connecting auxiliary electrical devices to be supplied with ignition controlled power when the ignition system is turned on;

a plurality of delayed shut-off power output terminals connected with said constant power input terminal and with said ignition controlled power input terminal for connecting auxiliary electrical devices to be supplied with power for a predetermined time interval after the ignition system has been turned off;

fuse elements connected between said constant power input terminal and said plurality of constant power output terminals, between said constant power input terminal and said plurality of ignition controlled power output terminals, and between said constant power input terminal and said plurality of delayed shut-off power output terminals; and timing means and relay means connected between said constant power input and ignition controlled power input terminals and said plurality of ignition controlled power output and plurality of delayed shut-off power output terminals to provide ignition controlled voltage to said plurality of ignition controlled power output and said plurality of delayed shut-off power output terminals upon said ignition system being turned on, and to immediately disconnect voltage to said plurality of ignition controlled power output terminals upon the ignition system being turned off, and after a predetermined time interval after the ignition system has been turned off, to disconnect voltage to said plurality of delayed shut-off power output terminals.

6. The power distribution and fuse panel unit according to claim 5 wherein said timing means includes an interconnected integrated circuit binary counter and an integrated flip-flop circuit;

said ignition controlled power input terminal is connected with said counter and said flip-flop circuit;

said relay means includes an ignition controlled relay connected with said ignition controlled power input terminal and having normally open contacts connected with said plurality of ignition controlled power output terminals;

said contacts being closed upon the ignition system being turned on and thereby supply D.C. voltage to said plurality of ignition controlled power output terminals; and said contacts being opened upon the ignition system being turned off to disconnect voltage to said plurality of ignition controlled power output terminals.

7. The power distribution and fuse panel unit according to claim 5 wherein said timing means includes an interconnected integrated circuit binary counter and an integrated flip-flop circuit;

said ignition controlled power input terminal is connected with said counter and said flip-flop circuit;

said relay means includes an ignition controlled relay connected with said ignition controlled power input terminal and having normally open contacts connected with said plurality of ignition controlled power output terminals, and a delayed shut-off power relay connected with said ignition controlled power input terminal and connected between said constant power input terminal and said flip-flop circuit, and said delayed shut-off power relay having normally open contacts connected with said plurality of delayed shut-off power output terminals;

said ignition controlled relay contacts and said delayed shut-off power relay contacts being closed upon the ignition system being turned on and thereby supply D.C. voltage to said plurality of ignition controlled power output terminals and to said plurality of delayed shut-off power output terminals, respectively; and upon the ignition system being turned off, said ignition relay contacts open thereby disconnecting voltage to said plurality of ignition controlled power output terminals and said counter is activated, and after the predetermined time interval said flip-flop circuit opens said delayed shut-off power relay contacts to disconnect voltage to said plurality of delayed shut-off power output terminals.

8. The power distribution and fuse panel unit according to claim 5 further comprising:

a plurality of input and output terminals, independent from said vehicle battery and said vehicle ignition system;

each of said input and output terminals joined together by a respective lead having a fuse holder for receiving fuses to provide a plurality of individual fused circuits for connecting externally powered devices.

9. The power distribution and fuse panel unit according to claim 5 further comprising;

a test switch and testing circuit operatively connected with said timing means to selectively shorten the time interval between the ignition system being turned off and the disconnection of voltage to said plurality of delayed shut-off power output terminals to quickly determine the operational status of the power distribution and fuse panel unit.

10. A power distribution and fuse panel unit for installation in a vehicle to facilitate connection of various vehicle auxiliary electrical devices having different power disconnect requirements, comprising:

a modular unit having a constant power input terminal adapted to be connected with a battery to provide a source of constant D.C. voltage, and an ignition controlled power input terminal adapted to be connected to an ignition system of the vehicle to provide a source of ignition controlled D.C. voltage upon the ignition system being turned on;

a plurality of constant power output terminals connected with said constant power input terminal for connecting auxiliary electrical devices to be supplied with constant power independently of the operation of the vehicle ignition system;

a plurality of ignition controlled power output terminals connected with said ignition controlled power input terminal for connecting auxiliary electrical devices to be supplied with ignition controlled power when the ignition system is turned on;

fuse elements connected between said constant power input terminal and said plurality of constant power output terminals and between said constant power input terminal and said plurality of ignition controlled power output terminals; and timing means and relay means connected between said constant power input and ignition controlled power input terminals and said plurality of ignition controlled power output terminals to provide ignition controlled voltage to said plurality of ignition controlled power output terminals upon said ignition system being turned on, and to immediately disconnect voltage to said plurality of ignition controlled power output terminals upon the ignition system being turned off.

11. The power distribution and fuse panel unit according to claim 10 wherein said timing means includes an interconnected integrated circuit binary counter and an integrated flip-flop circuit;

said ignition controlled power input terminal is connected with said counter and said flip-flop circuit;

said relay means includes an ignition controlled relay connected with said ignition controlled power input terminal and having normally open contacts connected with said plurality of ignition controlled power output terminals;

said contacts being closed upon the ignition system being turned on and thereby supply D.C. voltage to said plurality of ignition controlled power output terminals; and said contacts being opened upon the ignition system being turned off to disconnect voltage to said plurality of ignition controlled power output terminals.

12. The power distribution and fuse panel unit according to claim 10 further comprising:

a plurality of input and output terminals, independent from said vehicle battery and said vehicle ignition system;

each of said input and output terminals joined together by a respective lead having a fuse holder for receiving fuses to provide a plurality of individual fused circuits for connecting externally powered devices.

* * * * *